(12) United States Patent
Wentink et al.

(10) Patent No.: US 8,842,587 B2
(45) Date of Patent: Sep. 23, 2014

(54) WIRELESS CHANNEL CALIBRATION

(75) Inventors: Maarten Menzo Wentink, Naarden (NL); Albert Van Zeist, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 973 days.

(21) Appl. No.: 12/765,164

(22) Filed: Apr. 22, 2010

(65) Prior Publication Data

US 2010/0271992 A1    Oct. 28, 2010

Related U.S. Application Data

(60) Provisional application No. 61/172,124, filed on Apr. 23, 2009, provisional application No. 61/172,126, filed on Apr. 23, 2009, provisional application No. 61/172,130, filed on Apr. 23, 2009.

(51) Int. Cl.
*H04B 7/00* (2006.01)
*H04B 17/00* (2006.01)
*H04B 7/06* (2006.01)

(52) U.S. Cl.
CPC .......... *H04B 17/0062* (2013.01); *H04B 7/0617* (2013.01)
USPC .......................................................... 370/310

(58) Field of Classification Search
USPC ......... 370/203, 328, 310, 312, 324, 336, 345, 370/432, 508; 455/63.1, 69, 186.1
See application file for complete search history.

(56) References Cited

U.S. PATENT DOCUMENTS

| | | | |
|---|---|---|---|
| 2006/0116076 A1 | 6/2006 | Li et al. | |
| 2007/0206504 A1 | 9/2007 | Koo et al. | |
| 2007/0298742 A1* | 12/2007 | Ketchum et al. | 455/186.1 |
| 2008/0014870 A1* | 1/2008 | Kim | 455/69 |

(Continued)

FOREIGN PATENT DOCUMENTS

| | | |
|---|---|---|
| WO | 2007114804 A1 | 10/2007 |
| WO | 2008002972 A2 | 1/2008 |
| WO | WO2008036670 A2 | 3/2008 |
| WO | WO-2010117816 A1 | 10/2010 |

OTHER PUBLICATIONS 802.11 Working Group: "IEEE 802.11N Part 11: Wireless LAN Medium Access Control (MAC) and Physical Layer (PHY) specifications: Enhancements for Higher Throughput" IEEE, Mar. 2006, XP002469313.

(Continued)

*Primary Examiner* — Kwang B Yao
*Assistant Examiner* — Syed M Bokhari
(74) *Attorney, Agent, or Firm* — Kevin T. Cheatham

(57) ABSTRACT

This document describes, among other things, a method that includes transmitting a calibration initiation frame from a first wireless communication device to a second wireless communication device that comprises a single space-time stream transmitter via a wireless communication medium. The method also includes receiving at the first wireless communication device an acknowledgement frame sent from the second wireless communication device after the second wireless communication device receives the calibration initiation frame. The method further includes transmitting a null data packet (NDP) frame from the first wireless communication device to the second wireless communication device after receiving the acknowledgement frame. In some implementations, the method also includes performing beamforming calibration of a wireless communication channel between the first wireless communication device and the second wireless communication device based on the acknowledgement frame.

37 Claims, 7 Drawing Sheets

(56) References Cited

U.S. PATENT DOCUMENTS

| | | |
|---|---|---|
| 2008/0089396 A1 | 4/2008 | Zhang et al. |
| 2009/0097375 A1 | 4/2009 | Uefune et al. |
| 2009/0097395 A1* | 4/2009 | Zhang et al. ............... 370/203 |
| 2009/0225697 A1* | 9/2009 | Solomon ...................... 370/328 |
| 2010/0248635 A1* | 9/2010 | Zhang et al. ................ 455/63.1 |
| 2012/0281631 A1* | 11/2012 | Yamaura ...................... 370/328 |
| 2013/0177051 A1* | 7/2013 | Zhang et al. ................. 375/219 |

OTHER PUBLICATIONS

International Search Report and Written Opinion—PCT/US2010/032272, International Search Authority—European Patent Office—Mar. 16, 2011.

* cited by examiner

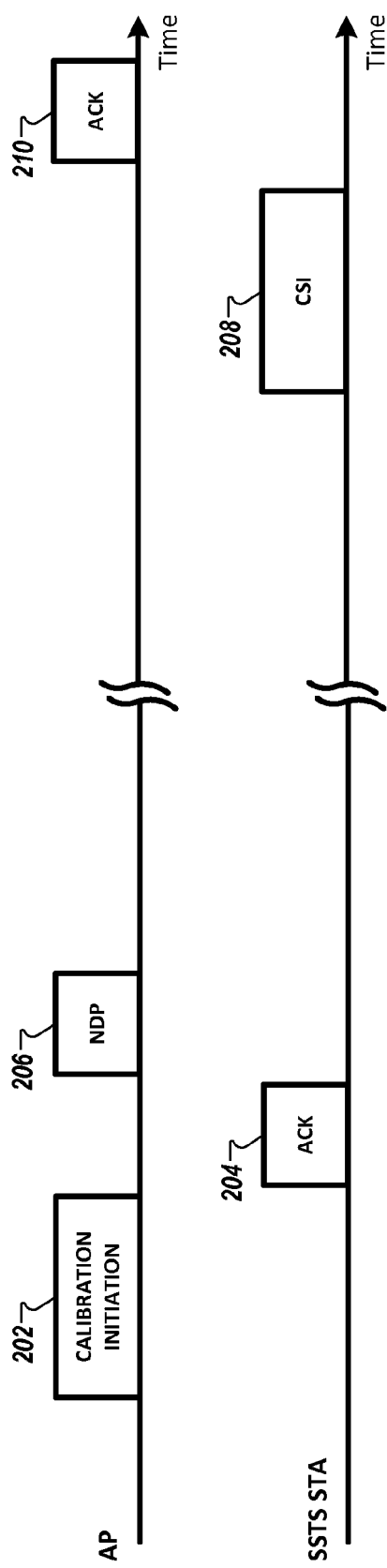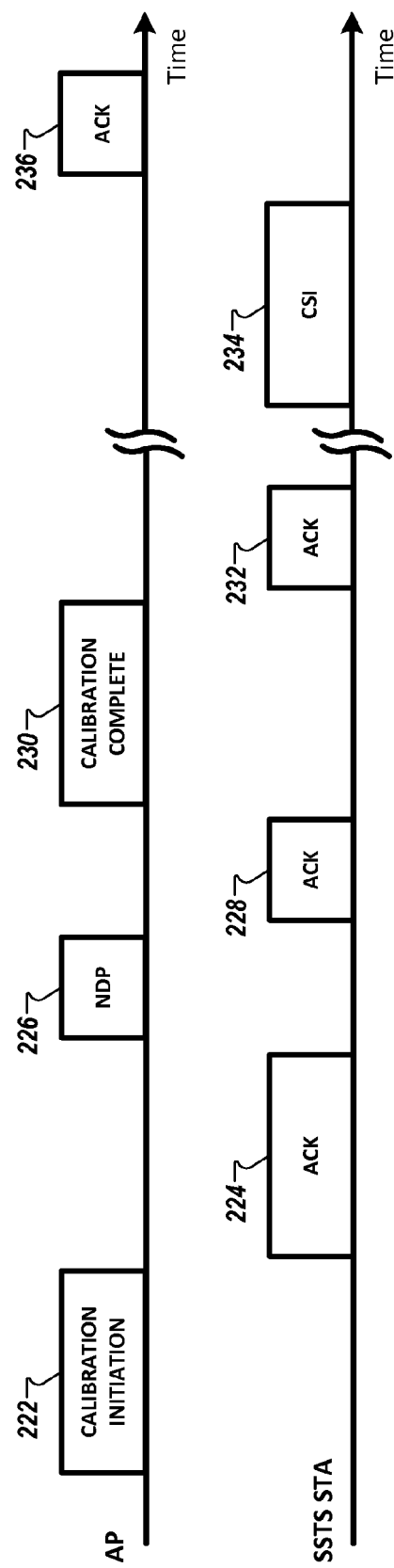

WIRELESS CHANNEL CALIBRATION

This application claims the benefit of U.S. Provisional Application Nos. 61/172,124, 61/172,126, and 61/172,130, each filed on Apr. 23, 2009, the entire contents of each of which are hereby incorporated by reference.

TECHNICAL FIELD

This disclosure relates to wireless communication, and more particularly, to techniques for calibrating a wireless communication channel.

BACKGROUND

Wireless communication systems, such as Wireless Local Area Networks (WLANs), Metropolitan Area Networks (commonly referred to as WiMAX), and other types of wireless networks, have become increasingly common in today's "always connected" society. These wireless communication systems are used in a variety of different contexts to provide a number of services including, for example, voice, video, packet data, broadcast, and messaging services.

In some wireless communication systems, one or more of the wireless devices in the network may communicate using multiple transmit antennas and multiple receive antennas. Devices communicating via multiple transmit and receive antennas can form a multiple-input multiple-output (MIMO) channel that may be used to increase data throughput and/or improve reliability of the communications between the devices. For example, a source device may simultaneously send multiple data streams over multiple transmit antennas to multiple receive antennas of a destination device, which may improve the data throughput from the source to the destination. In another example, the source device may send a single data stream using multiple transmit antennas to improve the reliability of reception by the destination device.

Some MIMO source devices use a technique known as beamforming to further improve the transmission capabilities of the source device. Beamforming is a spatial filtering mechanism used at a transmitter to improve the received signal power or signal-to-noise ratio at an intended receiver. In general, beamforming uses a combination of the transmission signals from multiple non-directional transmit antennas to simulate a larger directional antenna. The beamformed signals may then be "pointed" towards the destination device to improve the reception at the destination device.

SUMMARY

In general, this disclosure describes techniques for calibrating a wireless communication channel between two wireless communication devices. Calibration is used to improve the performance of a beamformed transmission from the beamforming device to the beamformee by determining correction matrices that may be applied such that the observed channel matrices in both directions of the link are substantial transposes of one another, which may render the resultant channel substantially reciprocal. The correction matrices, therefore, may promote correction of impairments that exist in the reciprocity between the devices during a beamformed transmission.

Some beamforming calibration processes use null data packets (NDPs) as sounding frames to estimate the channel between the beamforming device and the beamformee. However, some beamformees (e.g., single space-time stream devices) are not configured to support transmitting NDPs, and therefore beamforming calibration processes using NDPs are ineffective. This disclosure describes techniques for over-the-air calibration of a wireless communication channel between a beamforming device and a destination device that cannot transmit NDPs, e.g., a single space-time stream device. Rather than transmitting an NDP, the destination device may instead transmit an acknowledgement frame that allows the beamforming device to calibrate the channel between the two devices.

In one example, this disclosure provides a method that includes transmitting a calibration initiation frame from a first wireless communication device to a second wireless communication device that comprises a single space-time stream transmitter via a wireless communication medium. The method also includes receiving at the first wireless communication device an acknowledgement frame sent from the second wireless communication device after the second wireless communication device receives the calibration initiation frame. The method further includes transmitting a null data packet (NDP) frame from the first wireless communication device to the second wireless communication device after receiving the acknowledgement frame. In some implementations, the method also includes performing beamforming calibration of a wireless communication channel between the first wireless communication device and the second wireless communication device based on the acknowledgement frame.

In another example, this disclosure provides a wireless communication device that includes a wireless transmitter configured to transmit a calibration initiation frame to a second wireless communication device that comprises a single space-time stream transmitter via a wireless communication medium. The device also includes a wireless receiver configured to receive an acknowledgement frame sent from the second wireless communication device after the second wireless communication device receives the calibration initiation frame. The wireless transmitter is further configured to transmit a null data packet (NDP) frame to the second wireless communication device after receiving the acknowledgement frame. In some implementations, the device also includes a calibration module configured to perform beamforming calibration of a wireless communication channel between the wireless communication device and the second wireless communication device based on the acknowledgement frame.

In a further example, this disclosure provides a wireless communication device that includes means for transmitting a calibration initiation frame to a second wireless communication device that comprises a single space-time stream transmitter via a wireless communication medium. The device also includes means for receiving an acknowledgement frame sent from the second wireless communication device after the second wireless communication device receives the calibration initiation frame. The device further includes means for transmitting a null data packet (NDP) frame to the second wireless communication device after receiving the acknowledgement frame. In some implementations, the device also includes means for performing beamforming calibration of a wireless communication channel between the wireless communication device and the second wireless communication device based on the acknowledgement frame.

In another example, this disclosure provides a method that includes receiving, at a first wireless communication device that comprises a single space-time stream transmitter, a calibration initiation frame transmitted from a second wireless communication device via a wireless communication medium. The method also includes transmitting to the second wireless communication device an acknowledgement frame after receiving the calibration initiation frame. The method further includes receiving a null data packet (NDP) frame from the second wireless communication device sent after the second wireless communication device receives the acknowledgement frame. In some implementations, the method also includes determining a channel state information (CSI) feedback matrix based on the NDP frame, and transmitting to the second wireless communication device a CSI frame that can include the determined CSI feedback matrix.

In a further example, this disclosure provides a wireless communication device that comprises a single space-time stream transmitter. The device includes a wireless receiver configured to receive a calibration initiation frame transmitted from a second wireless communication device via a wireless communication medium. The device also includes a wireless transmitter configured to transmit to the second wireless communication device an acknowledgement frame after receiving the calibration initiation frame. The wireless receiver is further configured to receive a null data packet (NDP) frame from the second wireless communication device sent after the second wireless communication device receives the acknowledgement frame. In some implementations, the device also includes a calibration module to determine a channel state information (CSI) feedback matrix based on the NDP frame, and the wireless transmitter can be further configured to transmit to the second wireless communication device a CSI frame that includes the determined CSI feedback matrix.

In another example, this disclosure provides a method that includes transmitting a calibration initiation frame from a first wireless communication device to a second wireless communication device that comprises a single space-time stream transmitter via a wireless communication medium. The method also includes transmitting a null data packet (NDP) frame from the first wireless communication device to the second wireless communication device after transmitting the calibration initiation frame. The method further includes receiving at the first wireless communication device an acknowledgement frame sent from the second wireless communication device after the second wireless communication device receives the NDP frame. The method also includes transmitting a calibration complete frame from the first wireless communication device to the second wireless communication device after receiving the acknowledgement frame. In some implementations, the method also includes performing beamforming calibration of a wireless communication channel between the first wireless communication device and the second wireless communication device based on the acknowledgement frame.

In a further example, this disclosure provides a wireless communication device that includes a wireless transmitter configured to transmit a calibration initiation frame to a second wireless communication device that comprises a single space-time stream transmitter via a wireless communication medium, and to transmit a null data packet (NDP) frame to the second wireless communication device after transmitting the calibration initiation frame. The device also includes a wireless receiver configured to receive an acknowledgement frame sent from the second wireless communication device after the second wireless communication device receives the NDP frame. The wireless transmitter is further configured to transmit a calibration complete frame to the second wireless communication device after receiving the acknowledgement frame. In some implementations, the device also includes a calibration module configured to perform beamforming calibration of a wireless communication channel between the wireless communication device and the second wireless communication device based on the acknowledgement frame.

In another example, this disclosure provides a method that includes receiving, at a first wireless communication device that comprises a single space-time stream transmitter, a calibration initiation frame transmitted from a second wireless communication device via a wireless communication medium. The method also includes receiving a null data packet (NDP) frame from the second wireless communication device sent after the second wireless communication device transmits the calibration initiation frame. The method further includes transmitting to the second wireless communication device an acknowledgement frame after receiving the NDP frame. The method also includes receiving a calibration complete frame from the second wireless communication device sent after the second wireless communication device receives the acknowledgement frame. In some implementations, the method also includes determining a channel state information (CSI) feedback matrix based on the NDP frame, and transmitting to the second wireless communication device a CSI frame that includes the determined CSI feedback matrix.

The techniques described in this disclosure may be implemented in hardware, software, firmware, or any combination thereof. If implemented in hardware, an apparatus may be realized as an integrated circuit, a processor, discrete logic, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a computer-readable medium and loaded and executed in the processor.

Accordingly, this disclosure also contemplates a computer-readable storage medium comprising instructions that, upon execution, cause a processor to transmit a calibration initiation frame from a first wireless communication device to a second wireless communication device that comprises a single space-time stream transmitter via a wireless communication medium. The instructions also cause the processor to receive at the first wireless communication device an acknowledgement frame sent from the second wireless communication device after the second wireless communication device receives the calibration initiation frame. The instructions further cause the processor to transmit a null data packet (NDP) frame from the first wireless communication device to the second wireless communication device after receiving the acknowledgement frame. In some implementations, the instructions also cause the processor to perform beamforming calibration of a wireless communication channel between the first wireless communication device and the second wireless communication device based on the acknowledgement frame.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF DRAWINGS

FIGS. 2A-2C are timing diagrams illustrating example frame sequences used for beamforming calibration.

Like reference symbols in the various drawings indicate like elements.

DETAILED DESCRIPTION

Figure 1:
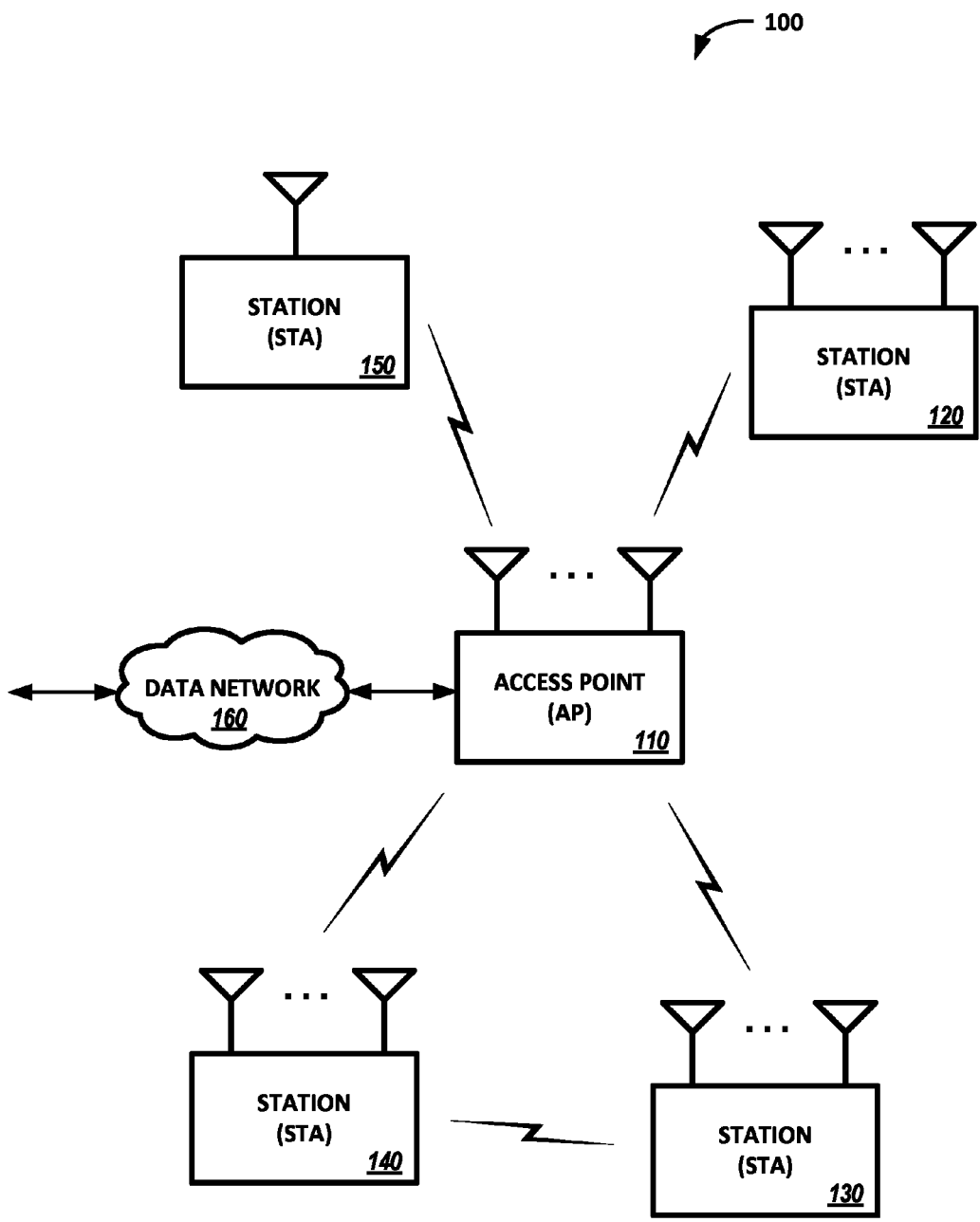
FIG. 1 is a block diagram illustrating an example of a wireless communication network.

In general, this disclosure relates to channel calibration techniques performed in MIMO systems, such as the MIMO systems described in the IEEE 802.11n-2009 amendment. In MIMO systems, a transmitter sends multiple streams by multiple transmit antennas to a receiver over a channel. A MIMO channel formed by multiple (T) transmit antennas at a transmitter and multiple (R) receive antennas at a receiver may be characterized by an R×T channel matrix $H_k$ for each subcarrier k or each group of subcarriers of interest. Channel matrix $H_k$ may be diagonalized by performing eigenvalue decomposition of a correlation matrix of $H_k$, as follows:

$$R_k = H_k^H H_k = V_k \Lambda_k V_k^H, \qquad \text{Eq (1)}$$

where $R_k$ is a T×T correlation matrix of $H_k$, $V_k$ is a T×T unitary matrix whose columns are eigenvectors of $R_k$, $\Lambda_k$ is a T×T diagonal matrix of eigenvalues of $R_k$, and "$H$" denotes a conjugate transpose.

Unitary matrix $V_k$ is characterized by the property $V_k^H V_k = I$, where I is the identity matrix. The columns of a unitary matrix are orthogonal to one another, and each column has unit power. $V_k$ is also referred to as a beamforming matrix. Diagonal matrix $\Lambda_k$ contains possible non-zero values along the diagonal and zeros elsewhere. The diagonal elements of $\Lambda_k$ are eigenvalues representing the power gains of the eigenmodes of $R_k$.

The transmitter (or beamformer, or beamforming device) may transmit spatial processing for beamforming to the receiver (i.e., the beamformee), as follows:

$$z_k = Q_k x_k, \qquad \text{Eq (2)}$$

where $x_k$ is a vector with up to T data symbols to be sent on subcarrier k, $Q_k$ is a steering matrix for subcarrier k, which may be derived based on $V_k$, and $z_k$ is a vector with T output symbols for the T transmit antennas on subcarrier k.

The beamforming in equation (2) steers or shapes the beams sent from the transmitter to the receiver. For effective beamforming, the transmitter should have an accurate estimate of the response of the MIMO channel from the transmitter to the receiver. This information on the MIMO channel may be used to derive appropriate steering matrices for transmitting spatial processing to direct the beams from the transmitter toward the receiver.

Although the over-the-air channel between the antennas at the transmitter and the antennas at the receiver are generally reciprocal, the observed baseband-to-baseband channel may not be reciprocal because the baseband-to-baseband channel may include impairments in the transmit and receive chains of the devices. For example, a power amplifier, which is typically one of the last components in a transmit chain, may introduce some phase shift that affects the channel. Various differences in the amplitude and phase characteristics of the transmit and receive chains tend to degrade the reciprocity of the observed over-the-air channel at baseband, and therefore, to degrade the overall performance of the communication. The channel calibration techniques described in this disclosure may be used to restore the reciprocity, or at least to reduce the differences between the transmit and receive chains, and to therefore improve the data communication performance between the transmitter and the receiver.

This disclosure describes techniques for over-the-air calibration of a wireless communication channel, where the receiver or destination device is a single space-time stream device and cannot transmit null data packets (NDPs). An NDP frame is a PHY Protocol Data Unit (PPDU) that carries no payload and thus carries no MAC Protocol Data Unit (MPDU), which implies that an NDP does not contain a transmitter or receiver MAC address. Instead, the addressing of the NDP frame is included in an accompanying frame that does carry an MPDU and that sets an NDP Announcement field to 1. This frame is referred to as an NDP Announcement. For devices that are configured to transmit not more than one space-time stream, transmitting an NDP is generally not allowed, because a single spatial stream NDP would be too short to process properly by the receiver of the NDP. This restriction generally excludes single space-time stream devices from participating in calibration procedures that use NDPs, which effectively prohibits the use of implicit beamforming to these devices when the beamforming device uses an NDP-based calibration procedure.

According to this disclosure, a calibration procedure involving a single space-time stream device uses an acknowledgement (ACK) frame sent from the single space-time stream device as a sounding frame, rather than an NDP being used as the sounding frame. A beamforming device, such as an access point, may cause the ACK frame to be sent from the single space-time stream device by setting the Ack Policy to Normal Ack in a frame that is sent to the single space-time stream device, such that the single space-time stream device acknowledges the receipt of the frame from the beamforming device by sending an ACK frame in response to that frame. The beamforming device may then use the information included in the ACK frame (e.g., long training fields (LTFs)) to calibrate the channel between the beamforming device and the single space-time stream device.

In addition to sending the ACK frame to the beamforming device, the single space-time stream device may also determine a channel state information (CSI) matrix that describes the propagation of signals through the channel, based on an NDP that is sent from the beamforming device to the single space-time stream device. The CSI matrix may be sent from the single space-time stream device to the beamforming device, and may also be used to calibrate the channel between the beamforming device and the single space-time stream device.

FIG. 1 is a block diagram illustrating an example of a wireless communication network 100. As shown, network 100 includes an access point 110 and multiple stations 120, 130, 140, 150. Access point 110 may be communicatively coupled to a data network 160, such as the Internet, an intranet, and/or any other wired or unwired network. Access point 110 may communicate with other networks, systems, or devices via data network 160.

A station (STA) is a wireless communication device that can communicate with another station via a wireless medium or channel. A station may also be called, and may contain some or all of the functionality of, a terminal, a mobile station, a subscriber unit, etc. Examples of different types of stations include cellular phones, handheld devices, wireless devices, personal digital assistants (PDAs), laptop computers, wireless modems, etc. An access point (AP) is a specific type of station that provides access to services via the wireless medium for stations associated with that access point. An access point may also be called, and may contain some or all of the functionality of, a base station, a base transceiver station (BTS), etc. In general, a wireless network may include any number of access points and any number of stations. Each station may be associated with a single access point at any given time, while an access point may be associated with multiple stations at any given time.

In the example network, access point 110 represents a MIMO-enabled wireless communication device with multiple transmit antennas and multiple receive antennas. Access point 110 is configured to communicate with stations 120-150 via a wireless medium using MIMO-based communication techniques, such as those described in the IEEE 802.11n wireless networking standard. However, it should be understood that the calibration techniques described in this disclosure are not limited to the IEEE 802.11n standard.

In example network 100, stations 120, 130 each have multiple transceivers and are capable of multiple space-time streams. Stations 120, 130 are also capable of transmitting NDPs, and may therefore participate in calibration procedures that utilize NDPs as sounding frames sent from the respective stations. Station 140 has multiple transceivers, but in this example is not configured to utilize multiple space-time streams. As such, station 140 is not allowed to transmit NDPs, and cannot participate in calibration procedures that utilize NDPs as sounding frames sent from the station. Similarly, station 150 has only a single transceiver, and is not capable of multiple space-time streams. Therefore, station 150 also cannot participate in calibration procedures that utilize NDPs as sounding frames sent from the station.

Access point 110 and one or more of stations 120-150 may associate with one another according to known techniques. For example, access point 110 may periodically transmit a beacon that carries a preamble, an access point identifier, and a list of parameters for operation in a network formed by the access point. Assuming stations 120-150 are within the coverage range of access point 110, stations 120-150 may detect the beacon, and may perform synchronization and may associate with access point 110. When a station associates with an access point, the station may communicate its capabilities with the access point (e.g., space-time stream capabilities, NDP transmission capabilities, etc.). In this example, when stations 120, 130 associate with access point 110, each of the stations 120, 130 may indicate that it is capable of multiple space-time streams, and that it is capable of transmitting NDPs. Similarly, when stations 140, 150 associate with access point 110, each of the stations 140, 150 may indicate that it is not capable of multiple space-time streams, and that it is not capable of transmitting NDPs. In the 802.11n standard, these and other device capabilities may be communicated in an Association Request frame sent from the station to the access point during association.

Following an association between one of stations 120-150 and access point 110, access point 110 may be able to perform beamformed communication with that station as described above. Also following an association, access point 110 may perform beamforming calibration to improve the performance of the beamformed communication. In the case of a multiple space-time stream device, e.g., either of stations 120, 130, the beamforming calibration procedure may utilize NDPs sent from the respective one of stations 120, 130. In the case of a single space-time stream device, e.g., either of stations 140, 150, one or more of the beamforming calibration techniques described herein may be utilized to improve the performance of the beamformed transmission from access point 110 to the respective one of stations 140, 150.

FIG. 2A is a timing diagram illustrating an example frame sequence used for beamforming calibration. In the example frame sequence, an over-the-air calibration procedure is initiated when a wireless communication device, e.g., access point 110, transmits a calibration initiation frame 202 to a station, e.g., either of stations 140, 150, that is a single space-time stream device. As described above, single space-time stream devices are generally not configured to transmit NDPs, and as such, the single space-time stream device is not required to transmit any NDPs as part of the frame sequence.

The over-the-air beamforming calibration procedure may be initiated by the beamforming device in any number of circumstances. For example, the beamforming device may initiate the procedure in response to a newly formed association between the beamforming device and a beamformee, e.g., one of stations 140, 150. In another example, the beamforming device may perform calibration at a configured time (e.g., at half-hour intervals throughout the day) or at a configured period of time after the last calibration that occurred (e.g., one hour after the previous calibration cycle). In yet another example, the beamforming device may perform calibration after determining that its calibration impairments might have changed (e.g., due to a detected rise in temperature of a chip, or based on a drop in communication performance, etc.). Similarly, the beamforming device may initiate calibration in response to other events or occurrences that indicate a possible change in the calibration parameters of the beamforming device. In other implementations, a beamformee may transmit a message to the beamforming device requesting that calibration occur.

Calibration initiation frame 202 may include one or more parameters that are provided in the MAC header, according to various implementations. For example, frame 202 may indicate an Ack Policy parameter set to Normal Ack, which causes the device that receives frame 202 to return an ACK frame after a short interframe space (SIFS) period, which may also be referred to as a SIFS time. Frame 202 may also include a High Throughput Control (HT Control, or HTC) field that indicates an NDP Announcement. The NDP Announcement field announces to the receiving device that an NDP will be transmitted after the frame. The NDP Announcement field is used because NDPs do not include a MAC header, so the receiving station may not otherwise recognize that the NDP was sent from a particular transmitting device, or for which device the NDP is intended.

Calibration initiation frame 202 may also include a request for channel state information (CSI) from the single space-time stream device by including a CSI feedback request in the frame. CSI generally refers to known channel properties of a communication link, such as the channel properties between a beamforming device and a beamformee, and generally describes how a signal propagates through the channel by representing the combined effects of signal degradation (e.g., scattering, fading, power decay, etc.). Frame 202 may further include a training request (TRQ) that may cause the single space-time stream device to respond with a sounding PPDU. For single space-time stream devices that receive a TRQ, such as in calibration initiation frame 202, the TRQ may be interpreted as a request to send a normal frame, which can be used as a sounding frame.

In response to calibration initiation frame 202, the single space-time stream device sends an acknowledgement (ACK) frame 204 a short interframe space (SIFS) time after receiving calibration initiation frame 202 (as elicited by the Ack Policy parameter being set to Normal Ack). Because any data packet sent from a single space-time stream device may be used for purposes of sounding the channel, the frame may alternatively be a different type of appropriate frame in various implementations. For example, calibration initiation frame 202 may include a Request to Send (RTS) indicator, and acknowledgement frame 204 may be of type Clear to Send (CTS). As another example, calibration initiation frame 202 may be of type Data and subtype Quality of Service (QoS)-Null, and acknowledgement frame 204 may be of type Control and subtype ACK.

After receiving acknowledgement frame 204, the beamforming device may use information contained in frame 204 to perform beamforming calibration of the wireless communication channel between the devices. For example, acknowledgement frame 204 may include a preamble with long training symbols, which allow the beamforming device to estimate the MIMO channel from the single space-time stream device to the beamforming device, and which may allow the beamforming device to determine correction matrices that compensate for the impairments in the transmit and receive chains.

In response to acknowledgement frame 204 sent from the single space-time stream device, the beamforming device may complete a first stage of the calibration sequence by transmitting a null data packet (NDP) frame 206 back to the single space-time stream device a SIFS time after receiving acknowledgement frame 204. As described above, the single space-time stream device may recognize that the NDP was sent from the beamforming device and that the NDP is meant for the single space-time stream device based on an NDP Announcement indicator and address fields in calibration initiation frame 202.

NDP frame 206 may include LTFs, which allow the single space-time stream device to determine a calibration feedback matrix according to procedures known in the art. The calibration feedback matrix may provide a quantized estimate of the channel from the beamforming device to the single space-time stream device. The determination of the calibration feedback matrix is not time-critical, and as such, the second stage of the calibration sequence is shown as separated by a time gap in the timing diagram.

At some time after the calibration feedback matrix has been determined by the single space-time stream device, the calibration feedback matrix is included in a channel state information (CSI) frame 208 that is sent from the single space-time stream device to the beamforming device. The information contained in CSI frame 208 may also be used by the beamforming device to calibrate the channel between the beamforming device and the single space-time stream device according to techniques known in the art. For example, the beamforming device may use the local estimation of the channel from the single space-time stream device to the beamforming device and the quantized estimate of the channel from the beamforming device to the single space-time stream device to determine correction matrices that reduce the effect of impairments in the transmit and receive chains.

A SIFS time after receiving CSI frame 208, the beamforming device transmits an acknowledgement (ACK) frame 210 to the single space-time stream device to conclude the calibration frame sequence.

FIG. 2B is another timing diagram illustrating an example frame sequence used for beamforming calibration. In the example frame sequence, an over-the-air calibration procedure is initiated when a wireless communication device, e.g., access point 110, transmits a calibration initiation frame 222 to a station, e.g., either of stations 140, 150, that is a single space-time stream device.

Calibration initiation frame 222 may include one or more parameters that are provided in the MAC header, according to various implementations. For example, frame 222 may indicate an Ack Policy parameter set to Normal Ack, which causes the device that receives frame 222 to return an ACK frame after a short interframe space (SIFS) period. Frame 222 may also include a High Throughput Control (HT Control, or HTC) field that indicates an NDP Announcement. The NDP Announcement field announces to the receiving device that an NDP will be transmitted after the frame.

In response to calibration initiation frame 222, the single space-time stream device sends an acknowledgement (ACK) frame 224 a short interframe space (SIFS) time after receiving calibration initiation frame 222 (as elicited by the Ack Policy parameter being set to Normal Ack). The frame 224 may alternatively be a different type of appropriate frame in various implementations. For example, calibration initiation frame 222 may include a Request to Send (RTS) indicator, and acknowledgement frame 224 may be of type Clear to Send (CTS).

After receiving acknowledgement frame 224 sent from the single space-time stream device, the beamforming device may transmit a null data packet (NDP) frame 226 back to the single space-time stream device a SIFS time after receiving acknowledgement frame 224. As described above, the single space-time stream device may recognize that the NDP was sent from the beamforming device and that the NDP is meant for the single space-time stream device based on an NDP Announcement field and address fields in calibration initiation frame 222. NDP frame 226 may include LTFs, which allow the single space-time stream device to determine a calibration feedback matrix according to procedures known in the art. The calibration feedback matrix may include a quantized estimate of the channel from the beamforming device to the single space-time stream device.

In response to NDP frame 226, the single space-time stream device sends a second acknowledgement frame 228 a SIFS time after receiving NDP frame 226. The beamforming device may use information contained in frame 228 to perform beamforming calibration of the wireless communication channel between the devices. For example, acknowledgement frame 228 may include long training symbols, which allow the beamforming device to estimate the MIMO channel from the single space-time stream device to the beamforming device, and which may allow the beamforming device to determine correction matrices that compensate for the impairments in the transmit and receive chains.

A SIFS time after receipt of second acknowledgement frame 228, the beamforming device may send a calibration complete frame 230 to the single space-time stream device. Calibration complete frame 230 may indicate an Ack Policy parameter set to Normal Ack, which causes the single space-time stream device to return an ACK frame after a SIFS period. This is shown in the timing diagram as the third acknowledgement frame 232. Calibration complete frame 230 may also include a request for channel state information (CSI) from the single space-time stream device by including a CSI feedback request in the frame.

At some time after the calibration feedback matrix has been determined by the single space-time stream device (based on NDP frame 226), the single space-time stream device may send the calibration feedback matrix in a CSI frame 234 back to the beamforming device. The information contained in CSI frame 234 may also be used by the beamforming device to calibrate the channel between the beamforming device and the single space-time stream device according to techniques known in the art. For example, the beamforming device may use the local estimation of the channel from the single space-time stream device to the beamforming device and the quantized estimate of the channel from the beamforming device to the single space-time stream device to determine correction matrices that reduce the effect of impairments in the transmit and receive chains.

A SIFS time after receiving CSI frame 234, the beamforming device transmits an acknowledgement frame 236 to the single space-time stream device to conclude the calibration frame sequence.

Figure 2C:
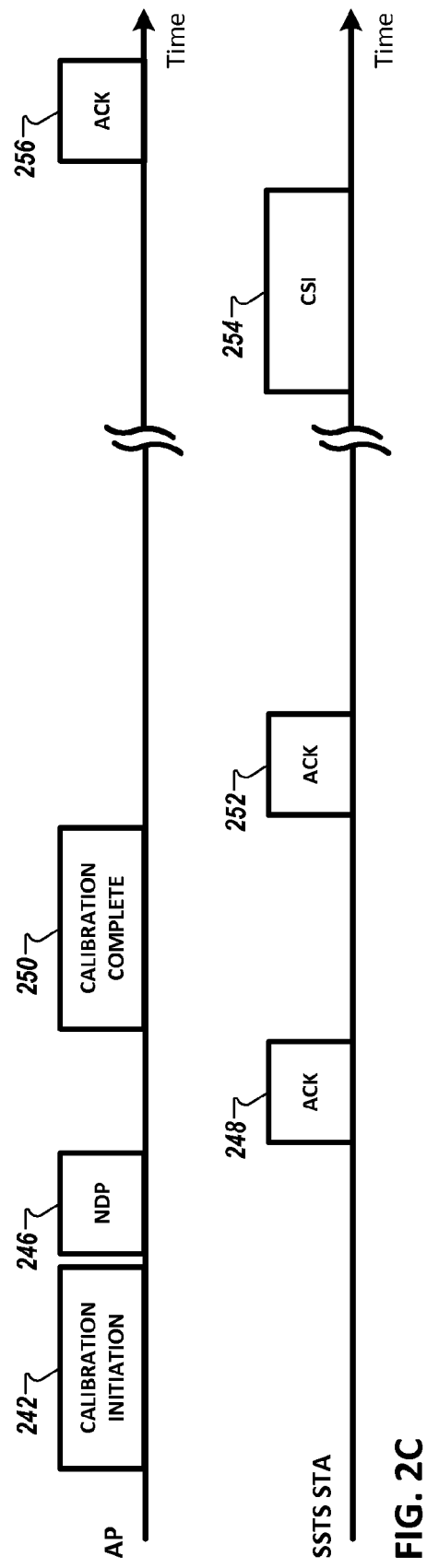

FIG. 2C is another timing diagram illustrating an example frame sequence used for beamforming calibration. In the example frame sequence, an over-the-air calibration procedure is initiated when a wireless communication device, e.g., access point 110, transmits a calibration initiation frame 242 to a station, e.g., either of stations 140, 150, that is a single space-time stream device.

Calibration initiation frame 242 may include one or more parameters that are provided in the MAC header, according to various implementations. For example, frame 242 may indicate an Ack Policy parameter set to No Ack, which requests that the single space-time stream device not send an acknowledgement frame in response to calibration initiation frame 242. Frame 242 may also include a High Throughput Control (HT Control, or HTC) field that indicates an NDP Announcement. The NDP Announcement field announces to the single space-time stream device that an NDP will be transmitted after the frame.

Without waiting for an acknowledgement (since the Ack Policy in frame 242 was set to No Ack), the beamforming device may transmit a null data packet (NDP) frame 246 to the single space-time stream device a short interframe space (SIFS) time after transmitting calibration initiation frame 242. As described above, the single space-time stream device may recognize that the NDP was sent from the beamforming device and that the NDP is meant for the single space-time stream device based on an NDP Announcement field and address fields in calibration initiation frame 242. NDP frame 246 may include LTFs, which allow the single space-time stream device to determine a calibration feedback matrix according to procedures known in the art. The calibration feedback matrix may include a quantized estimate of the channel from the beamforming device to the single space-time stream device.

In response to NDP frame 246, the single space-time stream device sends an acknowledgement frame 248 a SIFS time after receiving NDP frame 246. The beamforming device may use information contained in frame 248 to perform beamforming calibration of the wireless communication channel between the devices. For example, acknowledgement frame 248 may include long training symbols, which allow the beamforming device to estimate the MIMO channel from the single space-time stream device to the beamforming device, and which may allow the beamforming device to determine correction matrices that compensate for the impairments in the transmit and receive chains.

A SIFS time after receipt of acknowledgement frame 248, the beamforming device may send a calibration complete frame 250 to the single space-time stream device. Calibration complete frame 250 may indicate an Ack Policy parameter set to Normal Ack, which causes the single space-time stream device to return an ACK frame after a SIFS period. This is shown in the timing diagram as the second acknowledgement frame 252. Calibration complete frame 250 may also include a request for channel state information (CSI) from the single space-time stream device by including a CSI feedback request in the frame.

At some time after the calibration feedback matrix has been determined by the single space-time stream device (based on NDP frame 246), the single space-time stream device may send the calibration feedback matrix in a channel state information (CSI) frame 254 back to the beamforming device. The information contained in CSI frame 254 may also be used by the beamforming device to calibrate the channel between the beamforming device and the single space-time stream device according to techniques known in the art. For example, the beamforming device may use the local estimation of the channel from the single space-time stream device to the beamforming device and the quantized estimate of the channel from the beamforming device to the single space-time stream device to determine correction matrices that reduce the effect of impairments in the transmit and receive chains.

A SIFS time after receiving CSI frame 254, the beamforming device transmits an acknowledgement frame 256 to the single space-time stream device to conclude the calibration frame sequence.

The timing intervals in the frame sequences shown in FIGS. 2A-2C have been described as being a SIFS time period between packet exchanges, which is consistent with the 802.11n standard. However, it should be understood that in other implementations, different timing intervals may alternatively be utilized in the calibration sequences described above.

Figure 3:
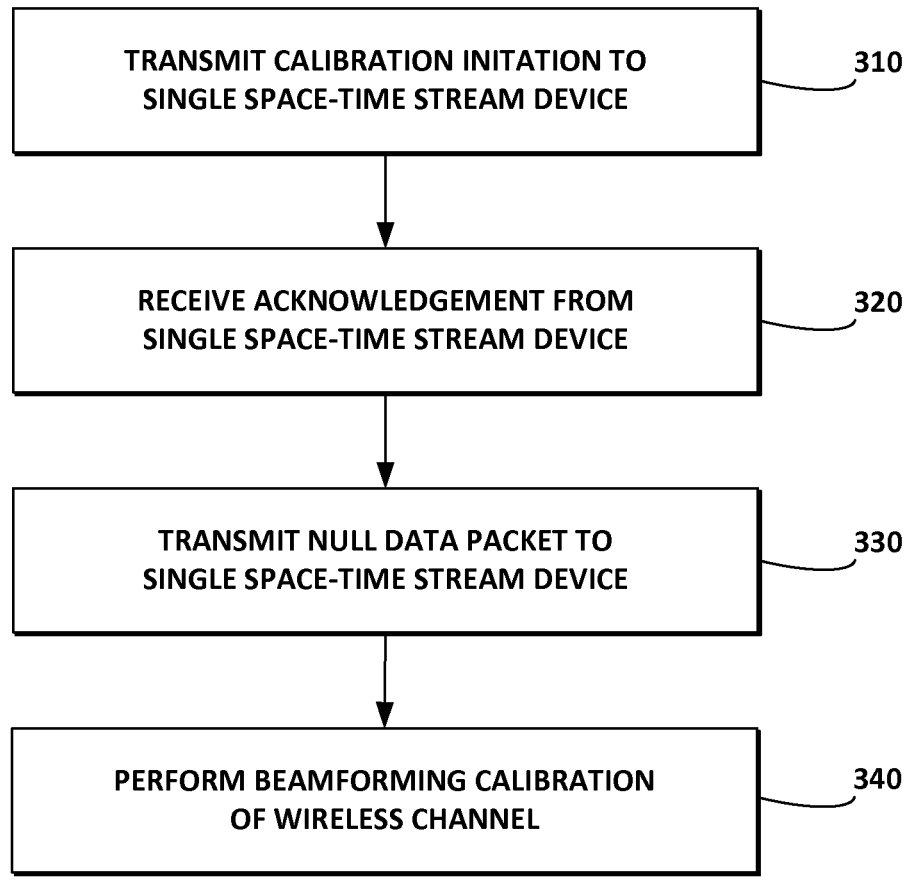
FIGS. 3-5 are flow diagrams illustrating example beamforming calibration techniques consistent with this disclosure.

FIG. 3 is a flow diagram illustrating an example beamforming calibration technique. The actions described in the flow diagram may be performed, for example, in a wireless communication network 100, and for clarity of presentation, the description that follows uses network 100 as the basis of an example for describing the technique. For example, the actions shown in the procedure may be implemented by a beamforming device, e.g., access point 110. However, the example beamforming calibration technique may alternatively be performed in another wireless communication network or combination of networks, and the technique may be performed by other devices or combinations of devices.

The example beamforming calibration technique begins when a beamforming device transmits a calibration initiation to a single space-time stream device (310). In this example, the single space-time stream device is the beamformee. The calibration technique may be initiated by the beamforming device in any number of circumstances. For example, the beamforming device, e.g., access point 110, may perform calibration in response to a newly formed association between the device and a beamformee, e.g., one of stations 140, 150. In another example, the beamforming device may perform calibration at a configured time (e.g., at half-hour intervals throughout the day) or at a configured period of time after the last calibration that occurred (e.g., one hour after the previous calibration cycle). In yet another example, the beamforming device may perform calibration after determining that its calibration impairments might have changed (e.g., due to a detected rise in temperature of a chip, or based on a drop in communication performance, etc.). Similarly, the beamforming device may initiate calibration in response to other events or occurrences that indicate a possible change in the calibration parameters of the beamforming device. In other implementations, a beamformee may transmit a message to the beamforming device requesting that calibration occur.

The calibration initiation may include one or more parameters that are provided in the MAC header of a calibration initiation frame, according to various implementations. For example, the calibration initiation frame may indicate an Ack Policy parameter set to Normal Ack, which causes the device that receives the calibration initiation frame to return an ACK frame after a short interframe space (SIFS) period. The calibration initiation frame may also indicate an NDP Announcement, which announces to the receiving device that an NDP will be transmitted after the frame. The calibration initiation frame may also include a request for channel state information (CSI) from the single space-time stream device by including a CSI feedback request in the frame. The calibration initiation frame may further include a training request (TRQ) that may cause the single space-time stream device to respond with a sounding PPDU.

A short time, e.g., a SIFS time, after receiving the calibration initiation, the beamformee transmits an acknowledgement that is received by the beamforming device (320). The acknowledgement may be elicited based on information in the calibration initiation (e.g., an Ack Policy parameter being set to Normal Ack). Certain information in the acknowledgement (e.g., long training symbols) may allow the beamforming device to estimate the MIMO channel from the single space-time stream device to the beamforming device.

After receiving the acknowledgement, the beamforming device transmits a null data packet back to the single space-time stream device (330). As described above, the single space-time stream device may recognize that the NDP was sent from the beamforming device and that the NDP is meant for the single space-time stream device based on an NDP Announcement field in the calibration initiation frame. The NDP includes long training fields (LTFs), which allow the single space-time stream device to determine a calibration feedback matrix according to procedures known in the art. The calibration feedback matrix may include a quantized estimate of the channel from the beamforming device to the single space-time stream device. At some time after the calibration feedback matrix has been determined by the single space-time stream device, the calibration feedback matrix may be sent from the single space-time stream device to the beamforming device.

Based on the information in the acknowledgement, the beamforming device performs beamforming calibration of the wireless communication channel between the devices (340). For example, LTFs included in the acknowledgement may allow the beamforming device to determine correction matrices that compensate for the impairments in the transmit and receive chains. The information contained in the calibration feedback matrix may also be used by the beamforming device to calibrate the channel between the beamforming device and the single space-time stream device. For example, the beamforming device may use the local estimation of the channel from the single space-time stream device to the beamforming device and the quantized estimate of the channel from the beamforming device to the single space-time stream device to determine correction matrices that reduce the effect of impairments in the transmit and receive chains.

Figure 4:
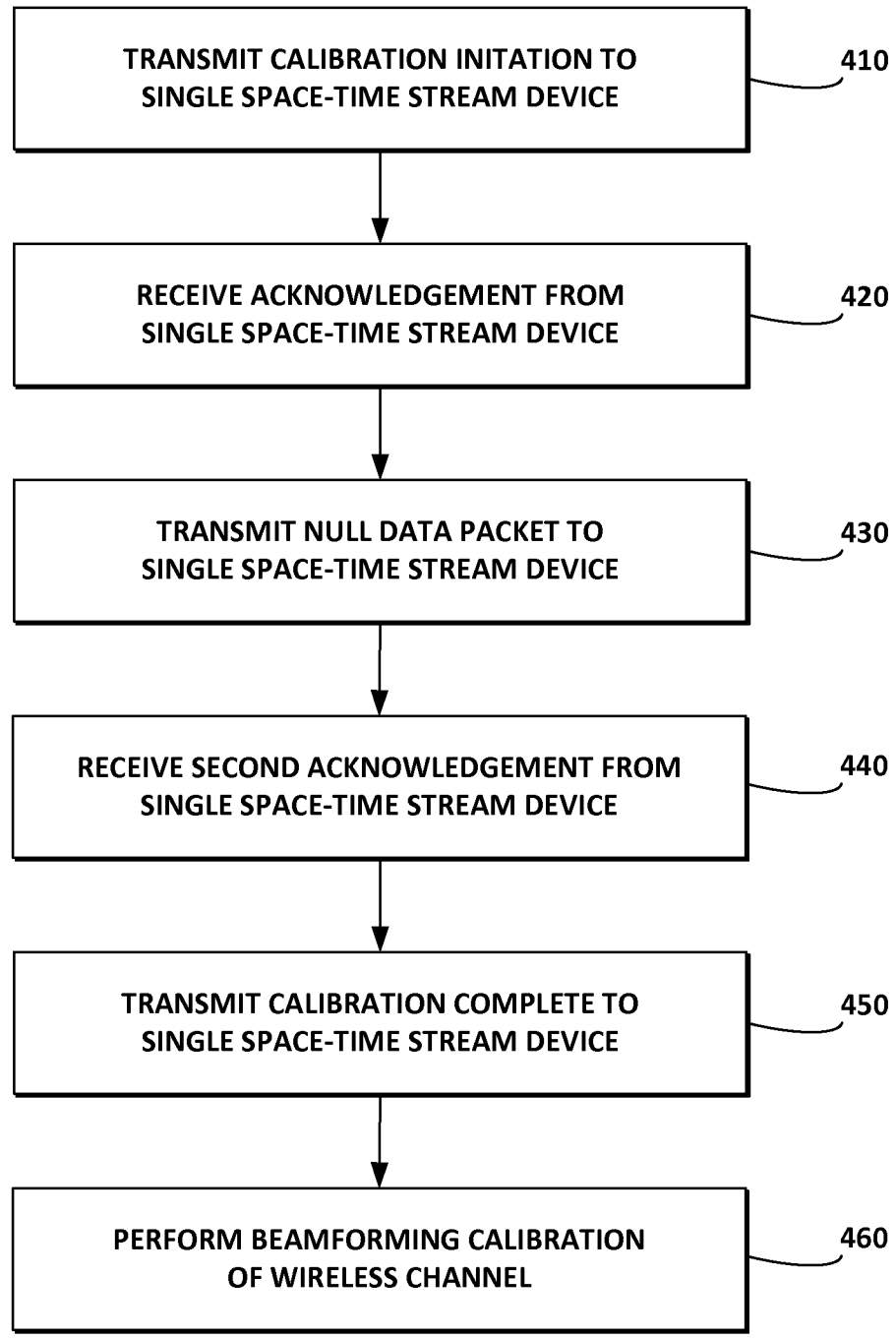

FIG. 4 is another flow diagram illustrating an example beamforming calibration technique. The actions described in the flow diagram may be performed, for example, in a wireless communication network 100, and for clarity of presentation, the description that follows uses network 100 as the basis of an example for describing the technique. For example, the actions shown in the procedure may be implemented by a beamforming device, e.g., access point 110. However, the example beamforming calibration technique may alternatively be performed in another wireless communication network or combination of networks, and the technique may be performed by other devices or combinations of devices.

The example beamforming calibration technique begins when a beamforming device transmits a calibration initiation to a single space-time stream device (410). The calibration technique may be initiated by the beamforming device in any number of circumstances, as described above. In other implementations, a beamformee may transmit a message to the beamforming device requesting that calibration occur.

The calibration initiation may include one or more parameters that are provided in the MAC header of a calibration initiation frame, according to various implementations. For example, the calibration initiation frame may indicate an Ack Policy parameter set to Normal Ack, which causes the device that receives the calibration initiation frame to return an ACK frame after a short interframe space (SIFS) period. The calibration initiation frame may also indicate an NDP Announcement, which announces to the receiving device that an NDP will be transmitted after the frame.

A short time, e.g., a SIFS time, after receiving the calibration initiation, the beamformee transmits an acknowledgement that is received by the beamforming device (420). The acknowledgement may be elicited based on information in the calibration initiation (e.g., an Ack Policy parameter being set to Normal Ack). Certain information in the acknowledgement (e.g., long training symbols) may allow the beamforming device to estimate the MIMO channel from the single space-time stream device to the beamforming device.

After receiving the acknowledgement, the beamforming device transmits a null data packet to the single space-time stream device (430). As described above, the single space-time stream device may recognize that the NDP was sent from the beamforming device and that the NDP is meant for the single space-time stream device based on an NDP Announcement field and address fields in the calibration initiation frame. The NDP includes long training fields (LTFs), which allow the single space-time stream device to determine a calibration feedback matrix according to procedures known in the art. The calibration feedback matrix may include a quantized estimate of the channel from the beamforming device to the single space-time stream device. At some time after the calibration feedback matrix has been determined by the single space-time stream device, the calibration feedback matrix may be sent from the single space-time stream device to the beamforming device.

In response to the NDP, the single space-time stream device sends a second acknowledgement, which is received by the beamforming device (440). Certain information in the second acknowledgement (e.g., long training symbols) may allow the beamforming device to estimate the MIMO channel from the single space-time stream device to the beamforming device.

The beamforming device also sends a calibration complete message to the single space-time stream device (450). The calibration complete message may indicate an Ack Policy parameter set to Normal Ack, which causes the single space-time stream device to return an ACK frame after a SIFS period. The calibration complete message may also include a request for channel state information (CSI) from the single space-time stream device by including a CSI feedback request in the calibration complete message. The calibration feedback matrix that was determined by the single space-time stream device may be included in the CSI feedback that is sent from the single space-time stream device in response to the CSI feedback request.

Based on the information in the second acknowledgement, the beamforming device performs beamforming calibration of the wireless communication channel between the devices (460). For example, LTFs included in the second acknowledgement may allow the beamforming device to determine correction matrices that compensate for the impairments in the transmit and receive chains. The information contained in the calibration feedback matrix may also be used by the beamforming device to calibrate the channel between the beamforming device and the single space-time stream device. For example, the beamforming device may use the local estimation of the channel from the single space-time stream device to the beamforming device and the quantized estimate of the channel from the beamforming device to the single space-time stream device to determine correction matrices that reduce the effect of impairments in the transmit and receive chains.

Figure 5:
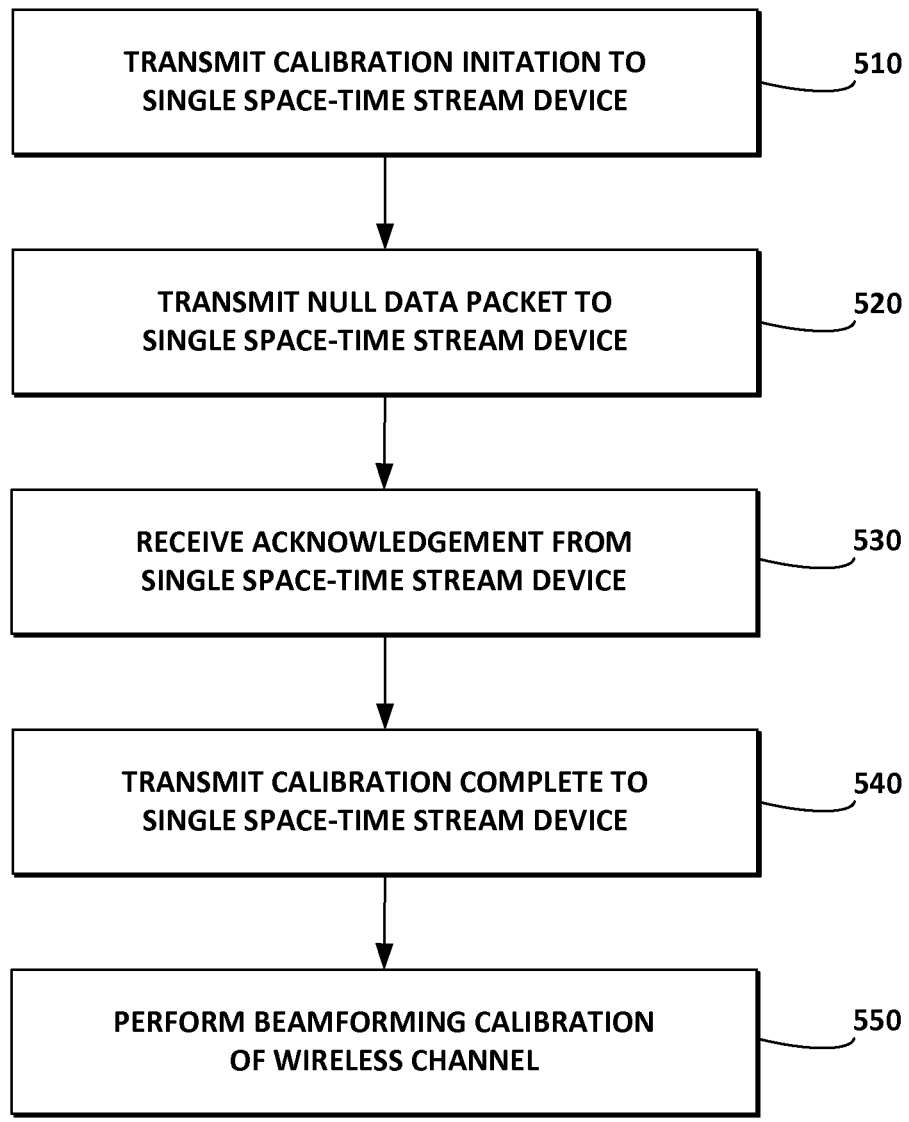

FIG. 5 is another flow diagram illustrating an example beamforming calibration technique. The actions described in the flow diagram may be performed, for example, in a wireless communication network 100, and for clarity of presentation, the description that follows uses network 100 as the basis of an example for describing the technique. For example, the actions shown in the procedure may be implemented by a beamforming device, e.g., access point 110. However, the example beamforming calibration technique may alternatively be performed in another wireless communication network or combination of networks, and the technique may be performed by other devices or combinations of devices.

The example beamforming calibration technique begins when a beamforming device transmits a calibration initiation to a single space-time stream device (510). The calibration technique may be initiated by the beamforming device in any number of circumstances, as described above. In other implementations, a beamformee may transmit a message to the beamforming device requesting that calibration occur.

The calibration initiation may include one or more parameters that are provided in the MAC header of a calibration initiation frame, according to various implementations. For example, the calibration initiation frame may indicate an Ack Policy parameter set to No Ack, which requests that the single space-time stream device not send an acknowledgement frame in response to calibration initiation. The calibration initiation frame may also indicate an NDP Announcement, which announces to the receiving device that an NDP will be transmitted after the frame.

After transmitting the calibration initiation, the beamforming device transmits a null data packet to the single space-time stream device (520). As described above, the single space-time stream device may recognize that the NDP was sent from the beamforming device and that the NDP is meant for the single space-time stream device based on an NDP Announcement field and address fields in the calibration initiation frame. The NDP includes long training fields (LTFs), which allow the single space-time stream device to determine a calibration feedback matrix according to procedures known in the art. The calibration feedback matrix may include a quantized estimate of the channel from the beamforming device to the single space-time stream device. At some time after the calibration feedback matrix has been determined by the single space-time stream device, the calibration feedback matrix may be sent from the single space-time stream device to the beamforming device, such as in response to a CSI feedback request.

In response to the NDP, the single space-time stream device sends an acknowledgement, which is received by the beamforming device (530). Certain information in the acknowledgement (e.g., long training symbols) may allow the beamforming device to estimate the MIMO channel from the single space-time stream device to the beamforming device.

The beamforming device also sends a calibration complete message to the single space-time stream device (540). The calibration complete message may indicate an Ack Policy parameter set to Normal Ack, which causes the single space-time stream device to return an ACK frame after a short interframe space (SIFS) period. The calibration complete message may also include a request for channel state information (CSI) from the single space-time stream device by including a CSI feedback request in the frame. The calibration feedback matrix that was determined by the single space-time stream device may be included in the CSI feedback.

Based on the information in the acknowledgement, the beamforming device performs beamforming calibration of the wireless communication channel between the devices (550). For example, LTFs included in the acknowledgement may allow the beamforming device to determine correction matrices that compensate for the impairments in the transmit and receive chains. The information contained in the calibration feedback matrix may also be used by the beamforming device to calibrate the channel between the beamforming device and the single space-time stream device. For example, the beamforming device may use the local estimation of the channel from the single space-time stream device to the beamforming device and the quantized estimate of the channel from the beamforming device to the single space-time stream device to determine correction matrices that reduce the effect of impairments in the transmit and receive chains.

Figure 6:
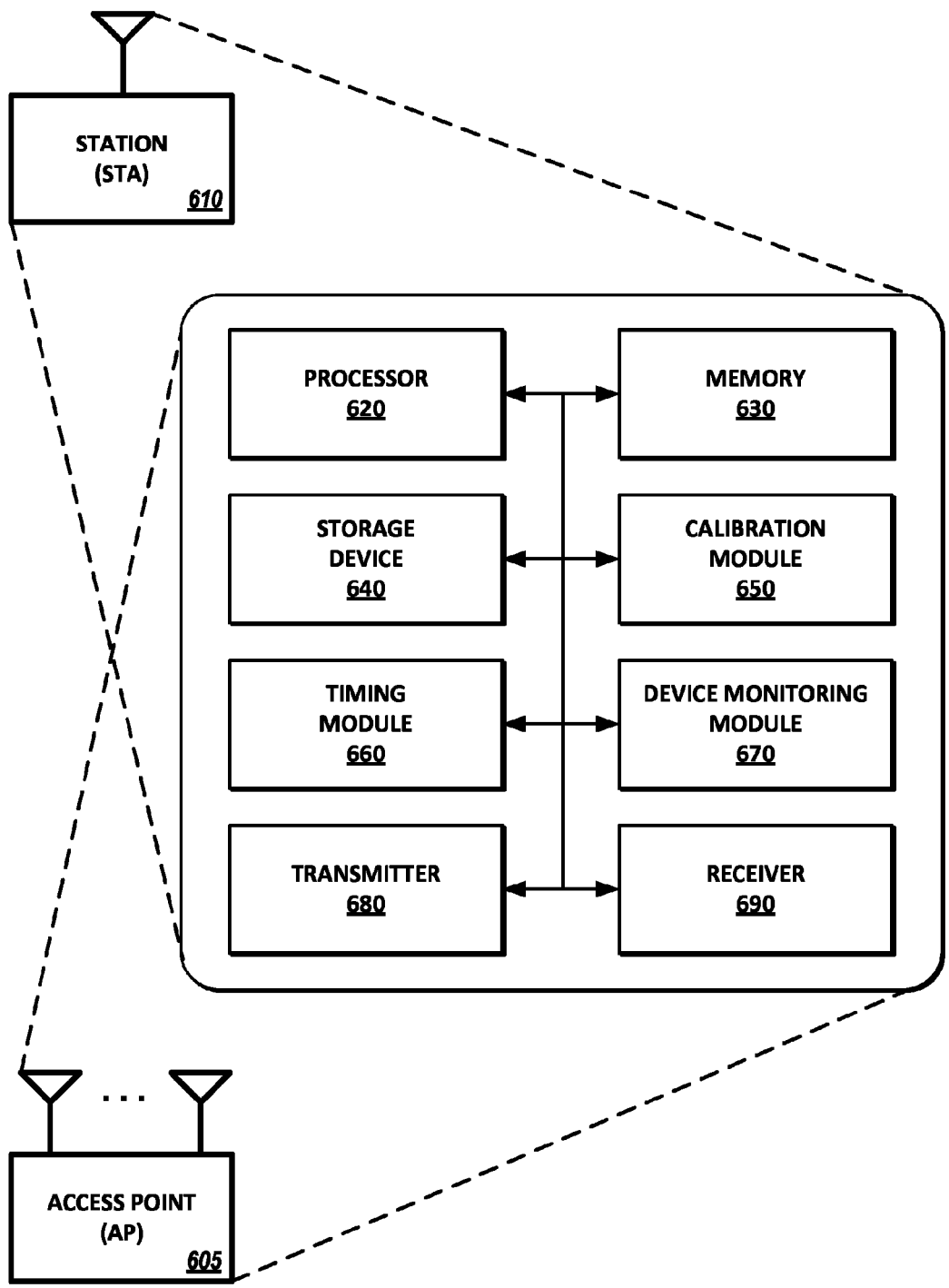
FIG. 6 is a block diagram illustrating example components of a wireless communication device.

FIG. 6 is a block diagram illustrating example components of a wireless communication device, such as an access point 605 or a station 610, which may be used to perform the over-the-air calibration techniques described herein. Access point 605 and station 610 may each include a processor 620, a memory 630, a storage device 640, a calibration module 650, a timing module 660, a device monitoring module 670, a transmitter 680, and a receiver 690. In some implementations, access point 605 and/or station 610 may have more than one of any of these components (e.g., multiple processors, multiple transmitters, or multiple receivers, etc.). For example, access point 605 has multiple transmitters 680 and multiple receivers 690 that may be used for MIMO-based communications. In some implementations, one or more of the various components may be combined into a single component (e.g., a transceiver that includes both transmitter 680 and receiver 690), or the functionality of one component may be separated across multiple components. Access point 605 and/or station 610 may also include more, fewer, or different components from those shown in the example.

Processor 620 may be used to process instructions for execution by access point 605 or station 610. Processor 620 may be a single threaded processor, or may be a multi-threaded processor configured to process various instructions in parallel simultaneously. Processor 620 may be capable of processing instructions stored in memory 630 or instructions stored on storage device 640. In one example, processor 620 may be configured to process instructions to execute the calibration techniques described herein.

In some implementations, memory 630 may be used to store program instructions for execution by processor 620. In other examples, memory 630 may be used by software or applications running on access point 605 or station 610 to temporarily store information during program execution. For example, memory 630 may store determined calibration matrices (e.g., a calibration matrix for every calibrated channel between a beamforming device and each respective beamformee) such that the matrices may be retrieved and applied to communications between the beamforming device and the respective beamformees to reduce the effect of impairments in the transmit and receive chains.

Storage device 640 may be described as a computer-readable storage medium, and may be configured to store larger amounts of information than memory 630. Storage device 640 may further be configured for long-term storage of information. For example, storage device 640 may store calibration parameters (e.g., length of calibration time-out, chip temperature range limits, etc.) related to the calibration techniques described herein.

Calibration module 650 may be used, for example, to determine the type of beamformee and to determine the type of calibration procedure that is to be executed. For example, if calibration module 650 determines that the beamformee is a single space-time stream device (e.g., based on the device capabilities transmitted during association), the beamforming device may utilize the calibration techniques described herein to calibrate the wireless communication channel between the beamforming device and the beamformee. Similarly, if calibration module 650 determines that the beamformee is capable of multiple space-time streams, the beamforming device may instead use a calibration procedure that utilizes NDPs being sent from the beamformee. In other implementations, calibration module 650 may selectively use the calibration techniques described herein to calibrate the wireless channel between the beamforming device and the beamformee, even if the beamformee is capable of multiple space-time streams.

Calibration module 650 may also be used to calibrate the wireless communication channel between the beamforming device and the beamformee. For example, calibration module 650 may use information (e.g., long training symbols) contained in a frame (e.g., an acknowledgement frame) sent from the beamformee to estimate the MIMO channel from the single space-time stream device to the beamforming device, and to determine correction matrices that compensate for the impairments in the transmit and receive chains. Calibration module 650 may also use information included in a calibration feedback matrix sent from the single space-time stream device (e.g., in a CSI frame) to calibrate the channel between the beamforming device and the single space-time stream device. For example, the beamforming device may use the local estimation of the channel from the single space-time stream device to the beamforming device and the quantized estimate of the channel from the beamforming device to the single space-time stream device to determine correction matrices that reduce the effect of impairments in the transmit and receive chains.

Timing module 660 may be used to monitor local time at access point 605 and at station 610. Timing module 660 may also include one or more timers that may be used to trigger certain tasks to be performed by access point 605 or station 610. For example, timing module 660 may be used trigger initiation of the calibration techniques described herein. In some implementations, a beamforming device, e.g., access point 605, may perform calibration at a configured time (e.g., at half-hour intervals throughout the day) or at a configured period of time after the last calibration that occurred (e.g., one hour after the previous calibration cycle).

Device monitoring module 670 may be used to identify various conditions or parameters related to access point 605 or station 610. One or more of these conditions or parameters, or a combination of the conditions or parameters may be used to trigger initiation of the calibration techniques described herein. For example, device monitoring module 670 may monitor a chip temperature over time. If device monitoring module 670 determines that the chip temperature has risen a certain amount (e.g., 0.5 degrees Fahrenheit) since the last time beamforming calibration has occurred, device monitoring module 670 may trigger a calibration procedure. Similarly, device monitoring module 670 may record and monitor communication performance between the device and one or more associated stations. If module 670 identifies a certain level of degradation in performance (e.g., a 10% drop in throughput), device monitoring module 670 may trigger a calibration procedure with one or more of the beamformees. In addition, device monitoring module 670 may monitor other system components or metrics for any indication that the impairments in the transmit and receive chains have changed, and if so, may trigger a calibration procedure according to the techniques described herein.

As described above, each device may include one or more transmitters 680. According to this disclosure, beamforming devices, such as access point 605, include at least two transmitters 680 such that the device can send beamformed messages to another device. Transmitter 680 may be used to transmit data frames to another station. For example, transmitter 680 of a beamforming device may be configured to transmit one or more calibration initiation frames, null data packet (NDP) frames, acknowledgement frames, calibration complete frames, and/or other data packets. Similarly, a beamformee such as station 610, may include only a single transmitter 680, which may be configured to transmit one or more acknowledgement frames, CSI frames, and/or other data packets to another station.

Each device may also include one or more receivers 690. Receiver 690 may be used to receive data frames from another station. For example, receiver 690 may be configured to receive one or more calibration initiation frames, null data packet (NDP) frames, acknowledgement frames, calibration complete frames, CSI frames, and/or other data packets.

The techniques of this disclosure may be embodied in a wide variety of devices or apparatuses, including a wireless handset, and integrated circuit (IC) or a set of ICs (i.e., a chip set). Any components, modules or units have been described provided to emphasize functional aspects and does not necessarily require realization by different hardware units, etc.

Accordingly, the techniques described herein may be implemented in hardware, software, firmware, or any combination thereof. Any features described as modules or components may be implemented together in an integrated logic device or separately as discrete but interoperable logic devices. If implemented in software, the techniques may be realized at least in part by a computer-readable medium comprising instructions that, when executed, performs one or more of the methods described above. The computer-readable data storage medium may form part of a computer program product, which may include packaging materials. The computer-readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules. Also, the techniques could be fully implemented in one or more circuits or logic elements.

Various aspects of the disclosure have been described. These and other aspects are within the scope of the following claims.

The invention claimed is:

1. A method comprising: transmitting a calibration initiation frame from a first wireless communication device to a second wireless communication device that comprises a single space-time stream transmitter via a wireless communication medium, the calibration initiation frame including an acknowledgement policy parameter set to request the second wireless communication device to return an acknowledgement frame after the second wireless communication device receives the calibration initiation frame; receiving at the first wireless communication device the acknowledgement frame sent from the second wireless communication device after the second wireless communication device receives the calibration initiation frame, wherein the second communication device is not configured to transmit a null data packet (NDP); transmitting a null data packet (NDP) frame from the first wireless communication device to the second wireless communication device after receiving the acknowledgement frame; receiving at the first wireless communication device a second acknowledgement frame sent from the second wireless communication device after the second wireless communication device receives the NDP frame; performing beamforming calibration of a wireless communication channel between the first wireless communication device and the second wireless communication device based on the second acknowledgement frame; and transmitting a calibration complete frame from the first wireless communication device to the second wireless communication device after receiving the second acknowledgement frame.

2. The method of claim 1, further comprising performing beamforming calibration of a wireless communication channel between the first wireless communication device and the second wireless communication device based on the acknowledgement frame.

3. The method of claim 2, further comprising receiving at the first wireless communication device a channel state information (CSI) frame sent from the second wireless communication device, and wherein performing beamforming calibration of the wireless communication channel is also based on the CSI frame.

4. The method of claim 3, wherein the CSI frame comprises a CSI feedback matrix determined by the second wireless communication device based on the NDP frame.

5. The method of claim 1, wherein the calibration initiation frame comprises a request for acknowledgement, an NDP announcement, and a request for channel state information (CSI).

6. The method of claim 5, wherein the calibration initiation frame further comprises a training request (TRQ).

7. The method of claim 1, further comprising receiving at the first wireless communication device a channel state information (CSI) frame sent from the second wireless communication device, and wherein performing beamforming calibration of the wireless communication channel is also based on the CSI frame.

8. The method of claim 7, wherein the CSI frame comprises a CSI feedback matrix determined by the second wireless communication device based on the NDP frame.

9. The method of claim 1, wherein the calibration initiation frame comprises a request for acknowledgement and an NDP announcement.

10. The method of claim 1, wherein the calibration complete frame comprises a request for channel state information (CSI).

11. A wireless communication device comprising: a wireless transmitter configured to transmit a calibration initiation frame to a second wireless communication device that comprises a single space-time stream transmitter via a wireless communication medium, the calibration initiation frame including an acknowledgement policy parameter set to request the second wireless communication device to return an acknowledgement frame after the second wireless communication device receives the calibration initiation frame; a wireless receiver configured to receive the acknowledgement frame sent from the second wireless communication device after the second wireless communication device receives the calibration initiation frame, wherein the second communication device is not configured to transmit a null data packet (NDP), wherein the wireless transmitter is further configured to transmit a null data packet (NDP) frame to the second wireless communication device after receiving the acknowledgement frame, wherein the wireless receiver is further configured to receive a second acknowledgement frame sent from the second wireless communication device after the second wireless communication device receives the NDP frame; and a calibration module configured to perform beamforming calibration of a wireless communication channel between the wireless communication device and the second wireless communication device based on the second acknowledgement frame, wherein the wireless transmitter is further configured to transmit a calibration complete frame to the second wireless communication device after receiving the second acknowledgement frame.

12. The wireless communication device of claim 11, further comprising a calibration module configured to perform beamforming calibration of a wireless communication channel between the wireless communication device and the second wireless communication device based on the acknowledgement frame.

13. The wireless communication device of claim 12, wherein the wireless receiver is further configured to receive a channel state information (CSI) frame sent from the second wireless communication device, and wherein the beamforming calibration is also based on the CSI frame.

14. The wireless communication device of claim 11, wherein the wireless receiver is further configured to receive a channel state information (CSI) frame sent from the second wireless communication device, and wherein the beamforming calibration is also based on the CSI frame.

15. A wireless communication device comprising: means for transmitting a calibration initiation frame to a second wireless communication device that comprises a single space-time stream transmitter via a wireless communication medium, the calibration initiation frame including an acknowledgement policy parameter set to request the second wireless communication device to return an acknowledgement frame after the second wireless communication device receives the calibration initiation frame; means for receiving the acknowledgement frame sent from the second wireless communication device after the second wireless communication device receives the calibration initiation frame, wherein the second communication device is not configured to transmit a null data packet (NDP); means for transmitting a null data packet (NDP) frame to the second wireless communication device after receiving the acknowledgement frame; means for receiving a second acknowledgement frame sent from the second wireless communication device after the second wireless communication device receives the NDP frame; means for performing beamforming calibration of a wireless communication channel between the wireless communication device and the second wireless communication device based on the second acknowledgement frame; and means for transmitting a calibration complete frame to the second wireless communication device after receiving the second acknowledgement frame.

16. The wireless communication device of claim 15, further comprising means for performing beamforming calibration of a wireless communication channel between the wireless communication device and the second wireless communication device based on the acknowledgement frame.

17. The wireless communication device of claim 16, further comprising means for receiving a channel state information (CSI) frame sent from the second wireless communication device, and wherein performing beamforming calibration of the wireless communication channel is also based on the CSI frame.

18. The wireless communication device of claim 15, further comprising means for receiving a channel state information (CSI) frame sent from the second wireless communication device, and wherein performing beamforming calibration of the wireless communication channel is also based on the CSI frame.

19. A non-transitory computer-readable storage medium comprising instructions that, upon execution, cause a processor to: transmit a calibration initiation frame from a first wireless communication device to a second wireless communication device that comprises a single space-time stream transmitter via a wireless communication medium, the calibration initiation frame including an acknowledgement policy parameter set to request the second wireless communication device to return an acknowledgement frame after the second wireless communication device receives the calibration initiation frame; receive at the first wireless communication device the acknowledgement frame sent from the second wireless communication device after the second wireless communication device receives the calibration initiation frame, wherein the second communication device is not configured to transmit a null data packet (NDP); transmit a null data packet (NDP) frame from the first wireless communication device to the second wireless communication device after receiving the acknowledgement frame; receive at the first wireless communication device a second acknowledgement frame sent from the second wireless communication device after the second wireless communication device receives the NDP frame; perform beamforming calibration of a wireless communication channel between the first wireless communication device and the second wireless communication device based on the second acknowledgement frame; and transmit a calibration complete frame from the first wireless communication device to the second wireless communication device after receiving the second acknowledgement frame.

20. The non-transitory computer-readable storage medium of claim 19, further comprising instructions that cause a processor to perform beamforming calibration of a wireless communication channel between the first wireless communication device and the second wireless communication device based on the acknowledgement frame.

21. The non-transitory computer-readable storage medium of claim 20, further comprising instructions that cause a processor to receive at the first wireless communication device a channel state information (CSI) frame sent from the second wireless communication device, and wherein performing beamforming calibration of the wireless communication channel is also based on the CSI frame.

22. The non-transitory computer-readable storage medium of claim 19, further comprising instructions that cause a processor to receive at the first wireless communication device a channel state information (CSI) frame sent from the second wireless communication device, and wherein performing beamforming calibration of the wireless communication channel is also based on the CSI frame.

23. A method comprising: receiving, at a first wireless communication device that comprises a single space-time stream transmitter, a calibration initiation frame transmitted from a second wireless communication device via a wireless communication medium; determining whether the calibration initiation frame includes an acknowledgement policy parameter that is set to request the first wireless communication device to return an acknowledgement frame after the first wireless communication device receives the calibration initiation frame; transmitting to the second wireless communication device the acknowledgement frame after determining that the calibration initiation frame includes the acknowledgement policy parameter that is set to request the first wireless communication device to return the acknowledgement frame, wherein the first communication device is not configured to transmit a null data packet (NDP); receiving a null data packet (NDP) frame from the second wireless communication device sent after the second wireless communication device receives the acknowledgement frame; transmitting to the second wireless communication device a second acknowledgement frame after receiving the NDP frame; performing beamforming calibration of a wireless communication channel between the wireless communication device and the second wireless communication device based on the second acknowledgement frame; and
receiving a calibration complete frame from the second wireless communication device sent after the second wireless communication device receives the second acknowledgement frame.

24. The method of claim 23, further comprising determining a channel state information (CSI) feedback matrix based on the NDP frame, and transmitting to the second wireless communication device a CSI frame that comprises the determined CSI feedback matrix.

25. The method of claim 23, further comprising determining a channel state information (CSI) feedback matrix based on the NDP frame, and transmitting to the second wireless communication device a CSI frame that comprises the determined CSI feedback matrix.

26. A wireless communication device comprising: a wireless receiver configured to receive a calibration initiation frame transmitted from a second wireless communication device via a wireless communication medium; a processor configured to determine whether the calibration initiation frame includes an acknowledgement policy parameter that is set to request the wireless communication device to return an acknowledgement frame after the wireless communication device receives the calibration initiation frame; and a wireless transmitter configured to transmit to the second wireless communication device the acknowledgement frame after the processor determines that the calibration initiation frame includes the acknowledgement policy parameter that is set to request the wireless communication device to return the acknowledgement frame, wherein the wireless transmitter is not configured to transmit a null data packet (NDP), wherein the wireless transmitter is further configured to transmit to the second wireless communication device a second acknowledgement frame after receiving the NDP frame, wherein the processor is configured to perform beamforming calibration of a wireless communication channel between the wireless communication device and the second wireless communication device based on the second acknowledgement frame, wherein the wireless receiver is further configured to receive a calibration complete frame from the second wireless communication device sent after the second wireless communication device receives the second acknowledgement frame, and wherein the wireless receiver is further configured to receive a null data packet (NDP) frame from the second wireless communication device sent after the second wireless communication device receives the acknowledgement frame, and wherein the wireless communication device comprises a single space-time stream transmitter.

27. The wireless communication device of claim 26, further comprising a calibration module to determine a channel state information (CSI) feedback matrix based on the NDP frame, and wherein the wireless transmitter is further configured to transmit to the second wireless communication device a CSI frame that comprises the determined CSI feedback matrix.

28. The wireless communication device of claim 26, further comprising a calibration module to determine a channel state information (CSI) feedback matrix based on the NDP frame, and wherein the wireless transmitter is further configure to transmit to the second wireless communication device a CSI frame that comprises the determined CSI feedback matrix.

29. A method comprising: transmitting a calibration initiation frame from a first wireless communication device to a second wireless communication device that comprises a single space-time stream transmitter via a wireless communication medium, the calibration initiation frame including an acknowledgement policy parameter set to request the second wireless communication device not to return an acknowledgement frame immediately after the second wireless communication device receives the calibration initiation frame; transmitting a null data packet (NDP) frame from the first wireless communication device to the second wireless communication device after transmitting the calibration initiation frame, wherein the second communication device is not configured to transmit a null data packet (NDP); receiving at the first wireless communication device the acknowledgement frame sent from the second wireless communication device only after the second wireless communication device receives the NDP frame performing beamforming calibration of a wireless communication channel between the first wireless communication device and the second wireless communication device based on the acknowledgement frame; and transmitting a calibration complete frame from the first wireless communication device to the second wireless communication device after receiving the acknowledgement frame.

30. The method of claim 29, further comprising receiving at the first wireless communication device a channel state information (CSI) frame sent from the second wireless communication device, and wherein performing beamforming calibration of the wireless communication channel is also based on the CSI frame.

31. The method of claim 30, wherein the CSI frame comprises a CSI feedback matrix determined by the second wireless communication device based on the NDP frame.

32. The method of claim 29, wherein the calibration initiation frame comprises an NDP announcement.

33. The method of claim 29, wherein the calibration complete frame comprises a request for channel state information (CSI).

34. A wireless communication device comprising: a wireless transmitter configured to transmit a calibration initiation frame to a second wireless communication device that comprises a single space-time stream transmitter via a wireless communication medium, and to transmit a null data packet (NDP) frame to the second wireless communication device after transmitting the calibration initiation frame, the calibration initiation frame including an acknowledgement policy parameter set to request the second wireless communication device not to return an acknowledgement frame immediately after the second wireless communication device receives the calibration initiation frame, wherein the second communication device is not configured to transmit a null data packet (NDP); and a wireless receiver configured to receive an acknowledgement frame sent from the second wireless communication device only after the second wireless communication device receives the NDP frame; wherein the wireless transmitter is further configured to transmit a calibration complete frame to the second wireless communication device after receiving the acknowledgement frame; and a calibration module configured to perform beamforming calibration of a wireless communication channel between the wireless communication device and the second wireless communication device based on the acknowledgement frame.

35. The wireless communication device of claim 34, wherein the wireless receiver is further configured to receive a channel state information (CSI) frame sent from the second wireless communication device, and wherein performing beamforming calibration of the wireless communication channel is also based on the CSI frame.

36. A method comprising: receiving, at a first wireless communication device that comprises a single space-time stream transmitter, a calibration initiation frame transmitted from a second wireless communication device via a wireless communication medium; determining whether the calibration initiation frame includes an acknowledgement policy parameter that is set to request the first wireless communication device not to return an acknowledgement frame immediately after the first wireless communication device receives the calibration initiation frame, wherein the second communication device is not configured to transmit a null data packet (NDP); receiving a null data packet (NDP) frame from the second wireless communication device sent after the second wireless communication device transmits the calibration initiation frame; transmitting to the second wireless communication device an acknowledgement frame only after receiving the NDP frame; performing beamforming calibration of a wireless communication channel between the wireless communication device and the second wireless communication device based on the acknowledgement frame; and receiving a calibration complete frame from the second wireless communication device sent after the second wireless communication device receives the acknowledgement frame.

37. The method of claim 36, further comprising determining a channel state information (CSI) feedback matrix based on the NDP frame, and transmitting to the second wireless communication device a CSI frame that comprises the determined CSI feedback matrix.

* * * * *